Patented Oct. 21, 1952

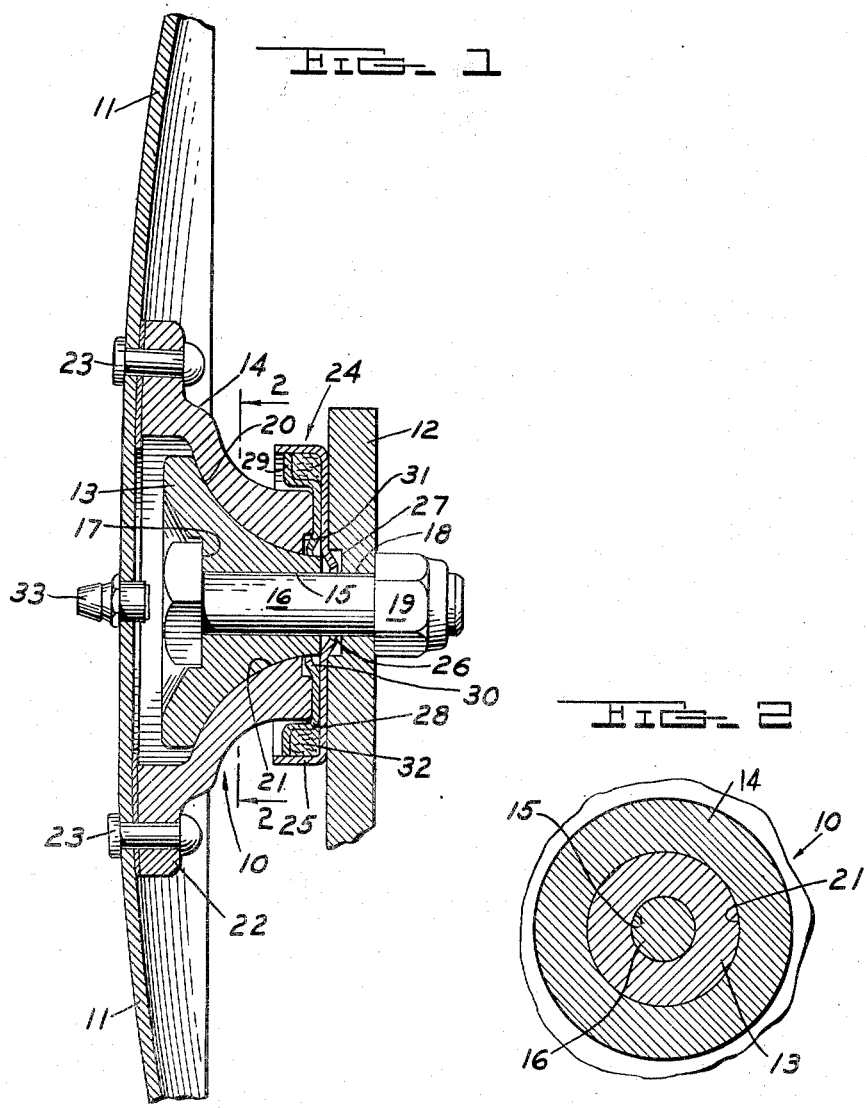

2,614,895

UNITED STATES PATENT OFFICE 2,614,895

BEARING FOR GRAIN DRILL DISKS

Robert L. Erwin, Royal Oak, Mich., assignor to Dearborn Motors Corporation, Highland Park, Mich., a corporation of Delaware Application April 30, 1949, Serial No. 90,648

4 Claims. (Cl. 308—19)

This invention relates to a bearing for a disc type farm implement and, more particularly, to a bearing for a ground engaging disc of the type employed in harrows, cultivators, grain drills, and the like. Although many farm implements utilize a revolving disc type of earth displacing tool, such as planters wherein the disc is employed to open a drill for the reception of the seeds being planted, all such implements are subject to early failures of the bearing supporting the disc. Such failure has largely resulted from cocking of the bearing under the side thrust inherent in disc operation, thereby producing line contact of the bearing surfaces and localizing the wear on such bearing surfaces.

Accordingly, it is an object of this invention to provide an improved bearing construction for a farm implement disc which will more adequately withstand the side thrust imposed thereon.

Another object of this invention is to provide a bearing of simplified construction having an unusually large bearing area under working conditions for supporting a revolving disc type farm tool.

A particular object of this invention is to provide an improved bearing construction for a grain drill disc of the type utilized in opening a furrow for the planting of grain.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention:

On the drawings:

Figure 1 is a longitudinal sectional view of a bearing embodying this invention showing a disc rotatably supported thereby.

Figure 2 is a cross sectional view taken along the plane 2—2 of Figure 1.

As shown on the drawings:

In Figure 1 there is shown a bearing generally indicated by the numeral 10 rotatably supporting a ground-engaging disc 11 on a depending arm 12 of a farm implement, such as a grain drill (not shown). Bearing 10 essentially comprises two members, an inner substantially conically-shaped, non-rotatable hub support 13, and a flanged, cup-like rotatable disc supporting member 14 surrounding support 13. Hub support 13 is provided with an axial hole 15 through which is inserted a bolt 16, such hole being counterbored as shown at 17 to accept the head of bolt 16. The exterior surface 20 of the conical portion of hub supporting member 13 is generally arcuately formed in cross section, such as may be generated by revolution of an arc of a circle about an axis disposed exteriorly of the arc. Such arcuate shape as shown in Figure 1 will be referred to as a concave toric section.

The disc-supporting hub 14 is likewise of generally conical configuration, such member being hollow and shaped to surround hub-supporting member 13. A convex toric section surface 21 corresponding to concave toric surface 20 is provided on the inside of disc support member 14 and cooperates with surface 20 in bearing relationship. An integral radial flange 22 is provided on disc support member 14 and conveniently permits disc 11 to be concentrically mounted on such member and secured thereto by a plurality of rivets or bolts 23.

Hub support 13 is non-rotatably mounted on arm 12 by bolt 16. Bolt 16 is passed through a hole 18 in arm 12 and a nut 19 is screwed on to the end of such bolt and tightened against arm 12. Thus bolt 16 draws hub support member 13 into non-rotatable engagement with arm 12 while disc support 14 is rotatably mounted on hub support member 13.

A grease retainer 24 is preferably placed between arm 12 and hub 14. Such retainer comprises a cup-shaped washer 25 provided with an axial hole 26 so that bolt 16 may pass therethrough. Hub support 13 bears against washer 25 and forces the edge of such washer about hole 26 into a recess 27 provided in arm 12. A second cup-shaped washer 28 provided with a radial, peripheral flange 29 is inserted within washer 25 as shown in Figure 1. Washer 28 is provided with an axial hole 29 to permit passage of bolt 16 therethrough. The edge of washer 28 about hole 29 is turned axially as shown at 30 and such upturned edge rests within an axial recess 31 provided in hub 14. A ring 32 of suitable gasket material is placed within the opening defined between the flange 29 of washer 28 and washer 25. Thus grease is retained within the bearing by retainer 24, such grease being readily introduced under pressure to the bearing surfaces 20 and 21 by way of a conventional grease fitting 33 in disc 11. Such retainer likewise effectively seals the bearing against the entrance of dirt therein.

From the foregoing description, it is readily apparent to those skilled in the art that there is here provided a bearing of simple and rugged construction capable of withstanding any normal thrust loads placed thereon. The toric shape of the bearing readily resists a side thrust load of large magnitude imposed against the disc 11 and any cocking that occurs does not produce line contacts, hence bearing life is substantially increased. This bearing therefore avoids the common fault of most bearings when subjected to a side thrust load because the cooperating arc-like bearing surfaces of the bearing members merely effect a sliding action relative to each other which maintains the bearing load distributed over the bearing surfaces, thereby maintaining a relatively large bearing area to resist such load. Such bearing obviously may be applied to any farm implement utilizing disc-like cutting tools or earth-displacing tools wherein corresponding thrust loads are encountered.

I claim:

1. A bearing for mounting a disc tool on an implement comprising a hub supporting member having a concave toric exterior bearing surface, a hollow hub surrounding said hub supporting member and having a convex toric interior bearing surface engageable in bearing relationship with said concave toric exterior bearing surface, means for non-rotatably securing said hub supporting member to the implement with the small diameter ends of said toric bearing surfaces disposed adjacent the implement, whereby said hollow hub is restrained against axial movement between said hub supporting member and the implement, said toric bearing surface being generated by an arc of a circle, whereby side thrust bearing load is distributed over a substantial area of said toric bearing surfaces.

2. A bearing for mounting a disc tool on an implement comprising a hub supporting member having a concave toric exterior bearing surface, a hollow hub surrounding said hub supporting member and having a convex toric interior bearing surface engageable in bearing relationship with said concave toric exterior bearing surface, means for non-rotatably securing said hub supporting member to the implement with the small diameter ends of said toric bearing surfaces disposed adjacent the implement, sealing means clamped between said small diameter end of said hollow hub and the implement whereby said hollow hub and said sealing means are restrained against axial movement relative to said hub supporting member, said toric bearing surfaces being generated by an arc of a circle, whereby side thrust bearing load is distributed over a substantial area of said toric bearing surfaces.

3. A bearing for mounting a disc tool on an implement comprising a hub supporting member having a concave toric exterior bearing surface, a hollow hub surrounding said hub supporting member and having a convex toric interior bearing surface engageable in bearing relationship with said concave toric exterior bearing surface, bolt means axially traversing said supporting member for non-rotatably securing said hub supporting member to the implement with the small diameter ends of said toric bearing surfaces adjacent the implement, whereby said hollow hub is restrained against axial movements between said hub supporting member and the implement, said toric bearing surfaces being generated by an arc of a circle, whereby side thrust bearing load is distributed over a substantial area of said toric bearing surfaces.

4. A bearing for mounting a disc tool on an implement comprising a hub supporting member having a concave toric exterior bearing surface, a hollow hub surrounding said hub supporting member and having a convex toric interior bearing surface engageable in bearing relationship with said concave toric exterior bearing surface, bolt means axially traversing said supporting member for non-rotatably securing said hub supporting member to the implement with the small diameter ends of said toric bearing surfaces adjacent the implement, annular sealing means surrounding said bolt means and clamped between said small diameter end of said hollow hub and the implement, whereby said hollow hub and said sealing means are restrained against axial displacement relative to said hub supporting member and the implement, said toric bearing surfaces being generated by an arc of a circle, whereby side thrust bearing load is distributed over a substantial area of said toric bearing surfaces.

ROBERT L. ERWIN.

REFERENCES CITED

The following references are of record in the file of this patent:

UNITED STATES PATENTS

| Number | Name | Date |
|--------|------|------|
| 217,698 | Manning | July 22, 1879 |
| 1,082,084 | Jones | Dec. 23, 1913 |
| 1,422,918 | Bohmker | July 18, 1922 |
| 2,410,927 | Callahan | Nov. 12, 1946 |